United States Patent Office
2,898,318
Patented Aug. 4, 1959

2,898,318

METHYL METHACRYLATE POLYMER COMPOSITION CONTAINING A LIQUID MIXED POLYESTER PLASTICIZER

David Hay Coffey and Dorothy Joyce Guest, Blackley, Manchester, England, assignors to Imperial Chemical Industries Limited, a corporation of Great Britain No Drawing. Application December 6, 1954
Serial No. 473,466

Claims priority, application Great Britain
December 18, 1953

2 Claims. (Cl. 260—31.6)

This invention relates to mixed polyesters and to their use in admixture with other polymeric materials particularly polymethyl methacrylate.

According to the present invention we provide liquid mixed polyesters formed by the condensation of a glycol, an aliphatic dicarboxylic acid and an aromatic monocarboxylic acid or mixtures thereof.

We have found that these mixed polyesters are excellent plasticisers for other polymeric materials such as cellulose derivatives and vinyl resins inasmuch as, in particular, they do not readily volatilise or migrate from such plasticised compositions.

The mixed polyesters are especially valuable as plasticisers for polymethylmethacrylate or for polymers formed by the copolymerisation of methyl methacrylate with other polymerisable compounds for example methacrylic acid. Other liquid polyesters have been described which are useful as plasticisers for vinyl polymers. Thus it is known to make plasticisers by the condensation of glycols and aliphatic dicarboxylic acids or by the condensation of glycols, aliphatic dicarboxylic acids and aliphatic monocarboxylic acids. Such polyesters have useful plasticising properties for some vinyl polymers but have only small compatibility with polymethylmethacrylate. Unexpectedly we have found that the class of polyesters forming the subject of this invention have excellent miscibility with polymethyl methacrylate and produce compositions having outstanding flexibility, good light and heat resistance and weathering resistance, and additionally the plasticiser shows little tendency to migrate from the plasticised composition.

The polyester may be conveniently formed by heating the selected reactants at polymerising temperatures in the absence of air or oxygen under conditions whereby water is removed from the reaction mixture in any conventional manner. Conventional esterification catalysts for example p-toluene-sulphonic acid, may be employed. Usually the polyester is formed from a glycol or a mixture of glycols, an aliphatic dicarboxylic acid or a mixture of aliphatic dicarboxylic acids, and an aromatic monocarboxylic acid or a mixture of aromatic and aliphatic monocarboxylic acids containing at least 50% of aromatic acid on a molar basis. Alternatively the polyester may be formed by reaction of a glycol with the desired acid chlorides. Another way of forming the polyester is to react the glycol with lower alkyl esters of the required acids in the presence of ester-interchange catalysts such as ZnO, PbO, $Sb_2O_3$, $ZnCl_2$, $SnCl_2$, $Zn(O.COCH_3)_2$.

Examples of glycols for use as starting materials are ethylene glycol, 1:2-propylene glycol, diethylene glycol and 1:3-butylene glycol. Examples of dibasic carboxylic acids are succinic, glutaric, adipic, methyladipic, pimelic and suberic acids. Examples of aromatic monocarboxylic acids are benzoic, o-toluic, m-toluic, p-toluic and chlorobenzoic acids. Examples of aliphatic monocarboxylic acids are lauric, palmitic, stearic and oleic acids, mixtures of fatty acids derived from vegetable oils, or animal oils, and rosin acids.

The various compounds are selected so that the polyester formed is liquid at normal temperatures. Normally if either the glycol or the dicarboxylic acid possesses a C—O—C grouping or a branched carbon skeleton then a liquid polyester is obtained.

The polyesters have a molecular weight of at least 500, and preferably greater than 700.

It is preferred to use a ratio of at least three moles of dicarboxylic acid to two moles of monocarboxylic acid to obtain products of low volatility. The volatility of the polyester may be still further reduced by employing a ratio of dicarboxylic acid to monocarboxylic acid greater than 3 to 2. Such variation in the composition of the polyester results also in a modification of the properties of the plasticised compositions obtained therefrom. In general, increasing the proportion of the monocarboxylic acid increases plasticising efficiency and compatibility.

The amount of glycol used in forming the polyester may be the stoichiometric equivalent of the acids used so that the esterification may be taken substantially to completion with production of polyester chains of which the terminal groups are all monocarboxylic acid residues. Alternatively by employment of quantities of glycol in excess of the equivalent of the acids used, polyesters may be formed of which only a proportion of the terminal groups are monocarboxylic acid residues, the other end-groups being almost all hydroxyl groups.

The liquid polyesters and the polymeric resins may be brought into uniform admixture in a number of ways. For instance, the components may be mixed or milled together if desired at a moderately elevated temperature. Alternatively, solutions or dispersions of the components may be mixed. In suitable cases, plasticised compositions can be prepared by polymerising monomeric substances, for example methyl methacrylate in solution in the polyester.

The plasticised polymeric compositions may be formed into shapes or spread or calendered on to a substrate. They may also be used in lacquers or varnishes for finishing leather, paper, rubber and plastic materials, and as components for paints.

The invention is illustrated but not limited by the following examples in which parts and percentages are expressed by weight.

Example 1

1254 parts of propylene glycol, 1825 parts of adipic acid and 610 parts of benzoic acid are heated together with agitation under carbon dioxide at 200–230° C. for 7½ hours. During this time water is distilled off from the reaction mixture. The product is a pale yellow oil of viscosity 29.2 stokes at 25° C. and acid value of 7.6 mg. KOH/g.

6.6 parts of the polyester so prepared are mixed with 40 parts of a 25% solution in xylene of a copolymer of methyl methacrylate (99 parts) and methacrylic acid (1 part). Films prepared by evaporating the solvent from the plasticizer/polymer mixture are clear, flexible and free from tack.

6.6 parts of the polyester are mixed with 10 parts of nitrocellulose dissolved in 30 parts of methyl ethyl ketone. The solvent may then be evaporated off leaving a clear, flexible, tack-free film.

Example 2

233 parts of diethylene glycol, 219 parts of adipic acid and 122 parts of benzoic acid are heated together with stirring in an atmosphere of carbon dioxide for 7½ hours at 220–230° C. During this time water is distilled off.

The product is a yellow oil having a viscosity of 9.8 stokes at 25° C. and an acid value of 11.05 mg. KOH/g.

6 parts of this polyester are mixed with 10 parts of polymethyl methacrylate previously dissolved in 30 parts of xylene. The solvent may be evaporated off leaving the plasticised polymer in the form of clear, flexible, tack-free film.

Example 3

183 parts of propylene glycol, 219 parts of adipic acid and 122 parts of benzoic acid are heated together with agitation under carbon dioxide at 190–200° C. for 15 hours and then for 4 hours at 200° C. at a pressure of 50 mm. Hg. During this time water is distilled off from the reaction mixture. The product is a pale yellow oil of viscosity 10.45 stokes at 25° C. and having an acid value of 9.4 mg. KOH/g.

6.6 parts of this polyester are mixed with 10 parts of polymethyl methacrylate previously dissolved in 30 parts xylene. The solvent may be evaporated off leaving the polymer in the form of clear, flexible, tack-free film.

Example 4

229 parts of propylene glycol, 274 parts of adipic acid, 125 parts of lauric acid and 85 parts of p-toluic acid are heated with stirring in an atmosphere of carbon dioxide for 17½ hours at 190–200° C. During this time water is distilled off for 4 hours at 190° C. at a pressure of 0.07 mm. hg. The product is a yellow oil having a viscosity of 5.22 stokes at 25° C. and an acid value of 6.7 mg. KOH/g.

6 parts of this polyester are mixed with 30 parts of a 30% solution of methyl methacrylate polymer in xylene. Film prepared by evaporating off the solvent from the plasticizer/polymer mixture are clear, flexible and tack-free.

Example 5

182 parts of propylene glycol, 146 parts of adipic acid and 272 parts of p-toluic acid are heated with stirring in an atmosphere of carbon dioxide for 17½ hours at 190–200° C. During this time water is distilled off. Further condensation is effected by heating for 4 hours at 190° C. at a pressure of 0.06 mm. The product is a pale yellow oil having a viscosity of 10.35 stokes at 25° C. and an acid value of 6.1 mg. KOH/g.

6.6 parts of this polyester are mixed with 10 parts of polymethyl methacrylate previously dissolved in 30 parts of xylene. Clear, flexible, tack-free films are obtained when the solvent is evaporated off.

Example 6

183 parts of propylene glycol, 177 parts of succinic acid, 68 parts of p-toluic acid and 100 parts of lauric acid are heated together with stirring in an atmosphere of carbon dioxide for 19 hours at 190–200° C. During this time water is distilled off. Further heating is then carried out for 4 hours at 190° C. at a pressure of 0.1 mm. Hg. The product is a yellow oil having a viscosity of 30.4 stokes at 25° C. and an acid value of 0.27 mg. KOH/g.

6.6 parts of this polyester are mixed with 10 parts of polymethyl methacrylate previously dissolved in 30 parts of xylene. The solvent may be evaporated off leaving the polymer in the form of clear flexible tack-free film.

Example 7

1171 parts of propylene glycol, 1533 parts of adipic and 854 parts of benzoic acid are heated together with stirring in an atmosphere of carbon dioxide for 44 hours at 190–200° C. During this time water is distilled off. The product is a yellow oil having a viscosity of 13.5 stokes at 25° C. and an acid value of 10.3 mg. KOH/g.

380 parts of xylene, 125 parts of methyl methacrylate, 1.25 parts of methacrylic acid, 82 parts of the polyester described above and 0.36 part of benzoyl peroxide are mixed together and heated to a temperature of 115° C. under reflux with agitation for 16 hours. The product gives clear, flexible, tack-free films when the product is evaporated off.

Example 8

168 parts of propylene glycol, 243 parts of adipic acid and 119 parts of p-tert-butylbenzoic acid are heated together with agitation under carbon dioxide at 220–230° C. for 5½ hours. During this time water is distilled off from the reaction mixture. The product is a light brown oil of viscosity 79.5 poises at 25° C. and of acid value 9.6 mg. KOH/g. It is useful as a plasticizer as described in the foregoing examples.

Example 9

137½ parts of 2:2-dimethylpropan-1:3-diol, 110 parts of glutaric acid and 49 parts of benzoic acid are heated together with agitation under carbon dioxide at 220–230° C. for 7¼ hours. During this time water is distilled off from the reaction mixture. The product is a light brown oil of acid value 8.0 mg. KOH/g. and viscosity 35.0 poises at 25° C. It is useful as a plasticizer as described in the foregoing examples.

What we claim is:

1. A plasticized composition comprising methylmethacrylate polymer plasticized with a liquid mixed polyester formed by the condensation of at least one aliphatic glycol, an aliphatic dicarboxylic acid containing up to eight carbon atoms and wherein the carboxylic acid groups are the sole reactive groups, and a monocyclic aromatic monocarboxylic acid.

2. The composition of claim 1 wherein said methylmethacrylate polymer is a copolymer of methylmethacrylate and methacrylic acid.

References Cited in the file of this patent

UNITED STATES PATENTS

| | | |
|---|---|---|
| 1,098,776 | Arsem | June 2, 1914 |
| 1,848,329 | Ellis | Mar. 8, 1932 |
| 1,975,246 | Zwilgmeyer | Oct. 2, 1934 |
| 2,151,185 | Carruthers | Mar. 21, 1939 |
| 2,729,609 | Tess | Jan. 3, 1956 |